(12) United States Patent
Zhang et al.

(10) Patent No.: US 11,074,829 B2
(45) Date of Patent: Jul. 27, 2021

(54) SYSTEMS AND METHODS FOR INTERACTIVE LANGUAGE ACQUISITION WITH ONE-SHOT VISUAL CONCEPT LEARNING THROUGH A CONVERSATIONAL GAME

(71) Applicant: Baidu USA, LLC, Sunnyvale, CA (US)

(72) Inventors: Haichao Zhang, Sunnyvale, CA (US); Haonan Yu, Sunnyvale, CA (US); Wei Xu, Saratoga, CA (US)

(73) Assignee: Baidu USA LLC, Sunnyvale, CA (US)

( * ) Notice: Subject to any disclaimer, the term of this patent is extended or adjusted under 35 U.S.C. 154(b) by 415 days.

(21) Appl. No.: 15/951,905

(22) Filed: Apr. 12, 2018

(65) Prior Publication Data
US 2019/0318648 A1 Oct. 17, 2019

(51) Int. Cl.
*G09B 19/00* (2006.01)
*G06N 3/08* (2006.01)
(Continued)

(52) U.S. Cl.
CPC .......... *G09B 19/00* (2013.01); *G06F 40/30* (2020.01); *G06N 3/0445* (2013.01);
(Continued)

(58) Field of Classification Search
CPC .......... G09B 19/00; G09B 19/06; G09B 7/04; G06F 40/30; G06F 17/30; G06N 3/0445; G06N 3/0454; G06N 3/08; G06N 3/04
See application file for complete search history.

(56) References Cited

U.S. PATENT DOCUMENTS

| 9,619,748 B1 | 4/2017 | Commons |
| 2017/0278018 A1 | 9/2017 | Mnih et al. |
| 2018/0060301 A1 | 3/2018 | Li |

FOREIGN PATENT DOCUMENTS

| CN | 106951512 A | 7/2017 |
| CN | 107480206 A | 12/2017 |

(Continued)

OTHER PUBLICATIONS

Stent et al., "Natural Language Generation in Interactive Systems," Cambridge University Press, 2014. (4pgs).
(Continued)

*Primary Examiner* — Timothy A Musselman
(74) *Attorney, Agent, or Firm* — North Weber & Baugh LLP

(57) ABSTRACT

Described herein are systems and methods for interactive language acquisition with one-shot concept learning through a conversational environment. Supervised language learning is limited by the ability of capturing mainly the statistics of training data, and is hardly adaptive to new scenarios or flexible for acquiring new knowledge without inefficient retraining or catastrophic forgetting. In one or more embodiments, conversational interaction serves as a natural interface both for language learning and for novel knowledge acquisition. Embodiments of a joint imitation and reinforcement approach are disclosed for grounded language learning through interactive conversation. An agent trained with this approach is able to actively acquire information by asking questions about novel objects and use the just-learned knowledge in subsequent conversations in a one-shot fashion. Results compared with other methods verified the effectiveness of embodiments disclosed herein.

20 Claims, 17 Drawing Sheets

(51) Int. Cl.
- G06N 3/04 (2006.01)
- G09B 19/06 (2006.01)
- G09B 7/04 (2006.01)
- G06F 40/30 (2020.01)

(52) U.S. Cl.
CPC .............. *G06N 3/0454* (2013.01); *G06N 3/08* (2013.01); *G09B 7/04* (2013.01); *G09B 19/06* (2013.01)

(56) References Cited

FOREIGN PATENT DOCUMENTS

| | | |
|---|---|---|
| CN | 107506823 A | 12/2017 |
| DE | 202017106132 U1 | 11/2017 |
| WO | 2017197018 A2 | 11/2017 |

OTHER PUBLICATIONS

Strub et al., "End-to-end optimization of goal-driven and visually grounded dialogue systems," In International Joint Conference on Artificial Intelligence (IJCAI), 2017.(7pgs).
Sukhbaatar et al., "Learning multiagent communication with backpropagation," In Advances in Neural Information Processing Systems (NIPS), 2016. (9pgs).
Sutton et al., "Reinforcement Learning: An Introduction," [online], [Retrieved Aug. 6, 2019]. Retrieved from Internet <URL: http://incompleteideas.net/book/bookdraft2017nov5.pdfhttp://incompleteideas.net/book/bookdraft2017nov5.pdf> (8pgs).
Wang et al., "Learning language games through interaction," In Association for Computational Linguistics (ACL), 2016. (11pgs).
Wang et al., "Sample efficient actor-critic with experience replay," In International Conference on Learning Representations (ICLR), 2017. (20 pgs).
Waxman, "Everything had a name, and each name gave birth to a new thought:links between early word learning and conceptual organization,"Cambridge, MA:The MIT Press,2004(41pgs).
Wen et al., "Semantically conditioned LSTM-based natural language generation for spoken dialogue systems," In Empirical Methods in Natural Language Processing, 2015. (11 pgs).
J.Weston, "Dialog-based language learning," In Advances in Neural Information Processing Systems (NIPS), 2016. (9 pgs).
Woodward & Finn, "Active One-shot learning," arXiv preprint, arXiv:1702.06559, 2017. (8 pgs).
Yu et al., "Interactivegrounded language acquisition and generalization in a 2D world," In International Conference on Learning Representations (ICLR), 2018. ( 29 pgs).
Yu et al., "SeqGAN: Sequence Generative Adversarial Nets with Policy Gradient," In Association for the Advancement of Artificial Intelligence (AAAI), 2017. (7pgs).
Zhang et al., "Listen,interact and talk: Learning to speak via interaction," arXiv preprint, arXiv:1705.09906, 2017. (10pgs).
Agarwal et al., "VQA: Visual Question Answering," arXiv preprint arXiv:1505.00468, 2016. (25 pgs).
Alan Baddeley, "Working Memory," Science, vol. 255(5044): 556-559, 1992. (4 pgs).
Bahdanau et al., "An actor-critic algorithm for sequence prediction," In International Conference on Learning Representations (ICLR), 2017. (17 pgs).
Baker et al., "Conversational Learning: An Experiential Approach to Knowledge Creation," Copley Publishing Group, 2002. (57 pgs).
Borovsky et al., "Learning to use words: Event related potentials index single-shot contextual word learning," Cognzition, 116(2):289-296, 2010. (17pgs).

Cho et al., "Learning phrase representations using RNN encoder-decoder for statistical machine translation," In (EMNLP), 2014. (15pgs).
Cho et al., Learning phrase representations using RNN encoder-decoder for statistical machine translation. In (EMNLP), 2014. (11pgs).
Das et al., "Learning cooperative visual dialog agents with deep reinforcement learning," arXiv preprint arXiv:1703.06585, 2017. (11 pgs).
Duan et al., "Benchmarking deep reinforcement learning for continuous control," arXiv preprint arXiv:1604.06778, 2016. (14pgs).
Duchi et al., "Adaptive subgradient methods for online learning and stochastic optimization," Journal of Machine Learning Research,12:2121-2159, 2011. (39 pgs).
Foerster et al., "Learning to communicate with deep multi-agent reinforcement learning," In Advances in Neural Information Processing Systems (NIPS), 2016. (9pgs).
Graves et al., "Neural turing machines," CoRR, abs/1410.5401, 2014. (3pgs).
He et al., "Deep reinforcement learning with a natural language action space," In Association for Computational Linguistics (ACL), 2016. (15pgs).
Houston et al., "Effects of early auditory experience on word learning and speech perception in deaf children with cochlear implants: Implications for sensitive periods of language development," Otology & Neurotology, 31:1248-1253, 2011. (7pgs).
P. K. Kuhl, "Early language acquisition:cracking the speech code," Nat Rev Neurosci, 5(2):831-843, 2004. (24 pgs).
Lake et al., "One shot learning of simple visual concepts," In Proceedings of the 33th Annual Meeting of the Cognitive Science Society, 2011. (6 pgs).
Lazaridou et al., "Multi-agent cooperation and the emergence of (natural) language," In International Conference on Learning Representations (ICLR), 2017. (11 pgs).
Li et al., "Learning through dialogue interactions by asking questions," In International Conference on Learning Representations (ICLR), 2017. (16pgs).
Li et al., "Deep reinforcement learning for dialogue generation," In Empirical Methods in Natural Language Processing (EMNLP), 2016. (11 pgs).
Mnih et al., "Playing Atari with deep reinforcement learning," In NIPS Deep Learning Workshop, 2013. (9pgs).
Mordatch et al., "Emergence of grounded compositional language in multi-agent populations," arXiv preprint arXiv:1703.04908, 2017. (10 pgs).
Petursdottir et al., "Reinforcement contingencies in language acquisition," Policy Insights from the Behavioral and Brain Sciences, 4(1):25-32, [online], [Retrieved Aug. 14, 2019]. Retrieved from Internet <URL: https://journals.sagepub.com/doi/abs/10.1177/2372732216686083?journalCode=bbsa>, 2016. (2pgs).
Ranzato et al., "Sequence level training with recurrent neural networks," In International Conference on Learning Representations (ICLR), 2016. (16 pgs).
Santoro et al., "Meta-Learning with Memory-Augmented neural networks," In International Conference on Machine Learning (ICML), 2016. (9 pgs).
Serban et al., "Building end-to-end dialogue systems using generative hierarchical neural network models," arXiv preprint arXiv:1507.04808, 2016. (8pgs).
B. F. Skinner, "Verbal Behavior," Copley Publishing Group, 1948. [online], [Retrieved Aug. 14, 2019]. Retrieved from Internet <URL: http://www.behavior.org/resources/595.pdf> (6pgs).
Stadie et al., "Third-person imitation learning," In International Conference on Learning Representations (ICLR), 2017. (16 pgs).
Non-Final Notification of Reasons for Refusal, dated Feb. 26, 2020, in Japanese Patent Application No. JP2019026738A, and the machine translation. (5 pgs).
Office Action dated Jan. 28, 2021, in Chinese Patent Application No. CN 201910046948.3, and the Machine Translation (13 pgs).

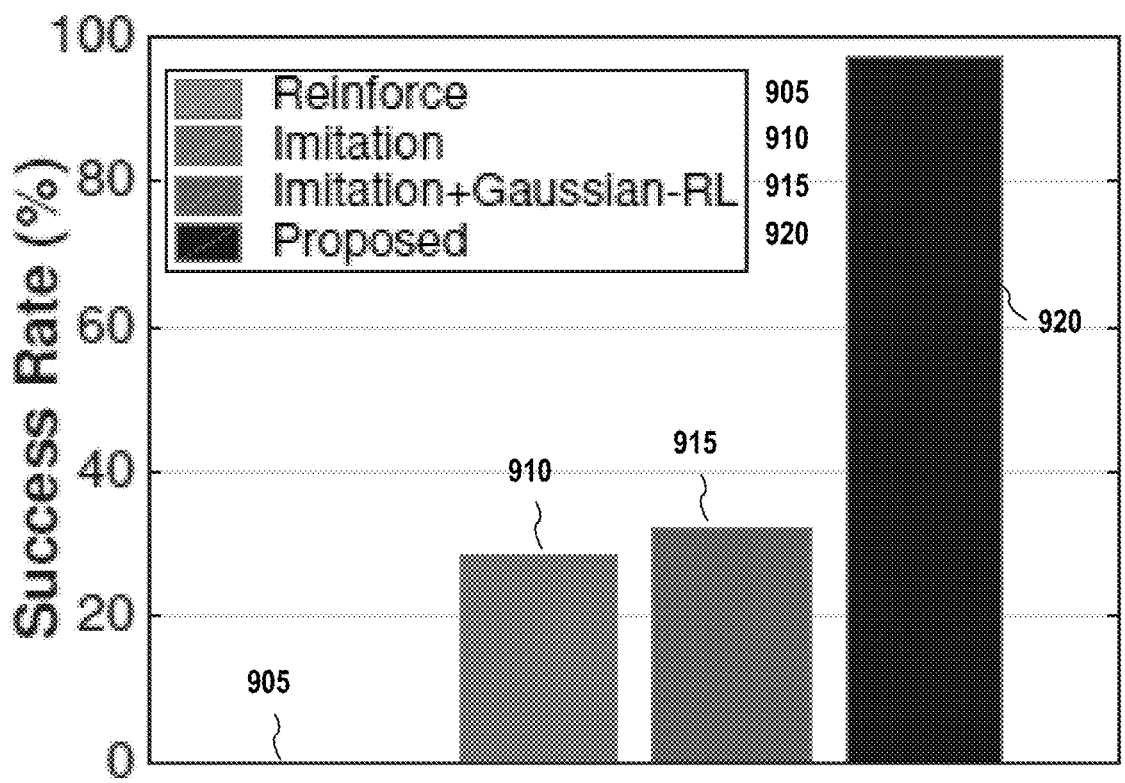
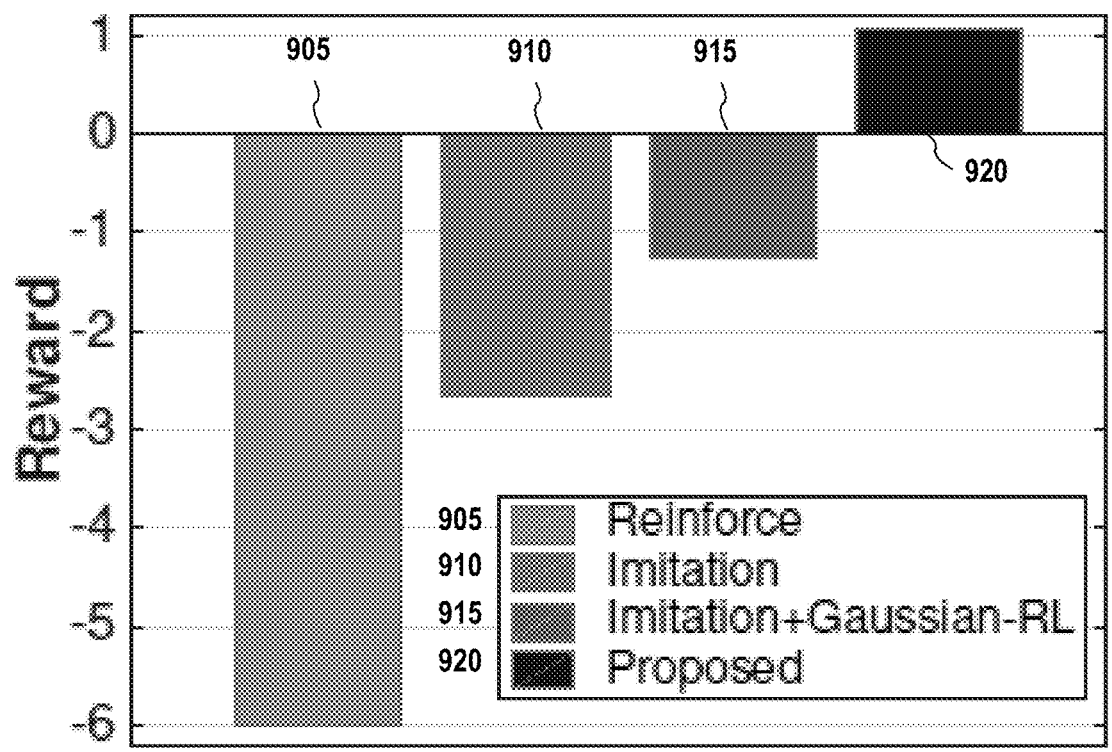
FIG. 9

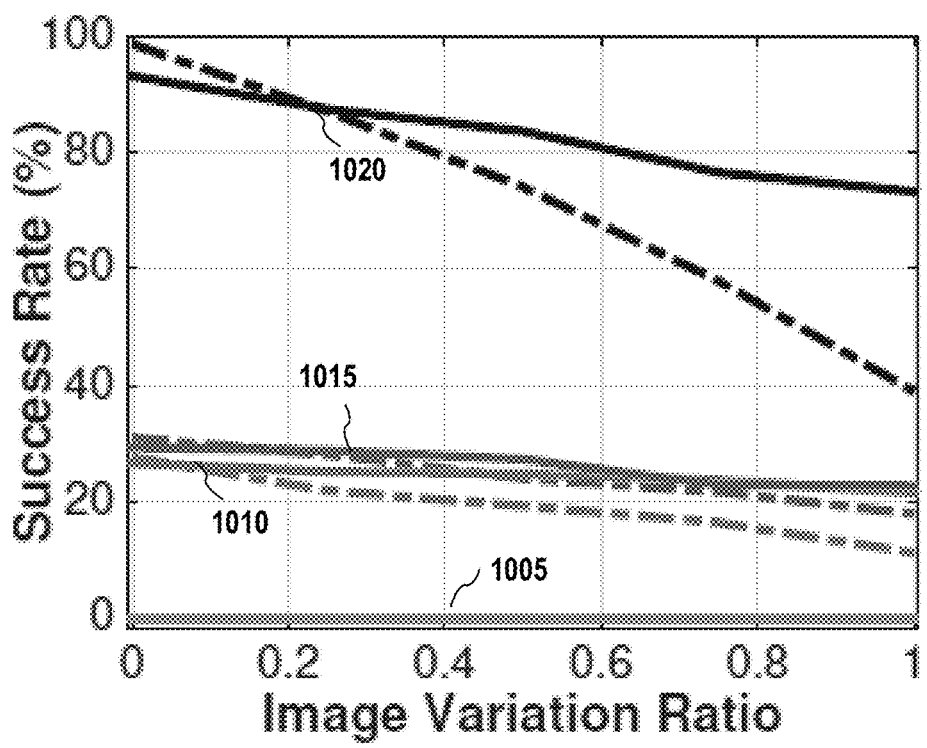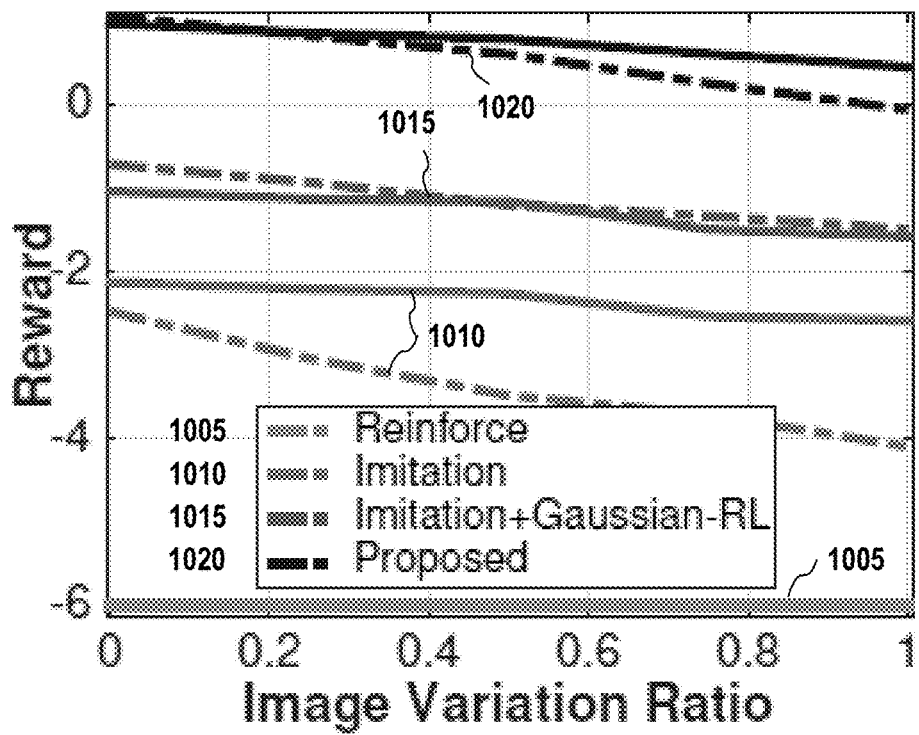
FIG. 10

1300A

| | | Reinforce | | |
|---|---|---|---|---|
| A1 | T: what<br>L: | C1 | T: there is orange<br>L: ✗ | E1 | T: i observe grape<br>L: ✗ |
| A1 | T: i can see cucumber<br>L: ✗ | D1 | T: tell what it is<br>L: ✓ | C3 | T: i can observe orange<br>L: ✗ |
| A2 | T: there is cucumber<br>L: ✗ | D1 | T: i see pineapple<br>L: ✗ | E2 | T: what is it<br>L: ✗ |
| B1 | T: tell what you can observe<br>L: ✓ | C2 | T: what can you see<br>L: ✓ | E2 | T: i see grape<br>L: ✗ |
| B1 | T: i observe cabbage<br>L: ✗ | C2 | T: there is orange<br>L: ✗ | C2 | T: tell what it is<br>L: ✗ |
| A3 | T:<br>L: FAILURE | D2 | T: what can you see<br>L: ✗<br>FAILURE | C2 | T: i observe orange<br>L: FAILURE | where:
A*n* = a version of an image of a cucumber
B*n* = a version of an image of a cabbage
C*n* = a version of an image of an orange
D*n* = a version of an image of a pineapple
E*n* = a version of an image of a grape

Imitation

| | | | | |
|---|---|---|---|---|
| E1 | T: apple<br>L: what is this ×<br>T: tell what it is | F2 | T: what is there<br>L: i can observe condor ×<br>T: tell what you see | I1 | T: i see lemon<br>L: what is this ×<br>T: i see lemon |
| G1 | L: i can see condor ×<br>T: this is apple<br>L: what is this | A3 | L: i can see condor<br>T: tell what you can see ×<br>L: i can see condor | I2 | L: what is this ×<br>T: tell what you can observe<br>L: i can see lemon |
| F2 | T: tell what there is<br>L: i can see apple × | H1 | T: what is there<br>L: i can see condor ×<br>T: | D3 | T: tell what there is<br>L: what is this ×<br>T: it is lemon |
| G2 | T:<br>L: what is this<br>T: i can observe apple × | F1 | L: what is this<br>T: i can see cucumber ×<br>L: what is this | I3 | L: what is this ×<br>T: tell what you observe<br>L: what is this |
| H1 | L: what is this ×<br>FAILURE | A1 | FAILURE | D2 | FAILURE | where:
An = a version of an image of a cucumber
Dn = a version of an image of a pineapple
Fn = a version of an image of an apple
Gn = a version of an image blueberries
Hn = a version of an image of a plum
In = a version of an image of a lemon

Imitation+Gaussian-RL

| | | | | | |
|---|---|---|---|---|---|
| J1 | T: i can see strawberry<br>L: i can see snail | ✗ | I1 | T: what do you observe<br>L: i can see tiger | |
| J2 | T: it is strawberry<br>L: i can see strawberry | ✓ | K1 | T: i can observe coconut<br>L: i can observe coconut | ✓ |
| J3 | T: i can see strawberry<br>L: i can see strawberry | ✓ | I2 | T: what can you see<br>L: i can see tiger | ✗ |
| G2 | T: blueberry<br>L: i can see blueberry | ✓ | K2 | T: what<br>L: i can see dog | ✗ |
| G1 | T: what<br>L: i can see blueberry | ✓ | I3 | T: tell what you can observe<br>L: i can see tiger | ✗ |
| | FAILURE | | | FAILURE | |

| | | |
|---|---|---|
| J3 | T: i can observe strawberry<br>L: i can see strawberry | ✓ |
| D3 | T: this is pineapple<br>L: i can see pineapple | ✓ |
| D1 | T: this is pineapple<br>L: i can see pineapple | ✓ |
| J1 | T: what do you see<br>L: i can see pineapple | ✗ |
| | FAILURE | | where:
Dn = a version of an image of a pineapple
Gn = a version of an image blueberries
In = a version of an image of a lemon
Jn = a version of an image of a strawberry or strawberries
Kn = a version of an image of a coconut

Proposed

| | | | | | |
|---|---|---|---|---|---|
| L1 | T:<br>L: tell what you observe ✓<br>T: this is watermelon<br>L: watermelon | M1 | T: tell what you can observe<br>L: tell what you observe ✓<br>T: i observe cherry<br>L: cherry | G1 | T:<br>L: tell what you observe ✓<br>T: i see blueberry<br>L: blueberry |
| L1 | T: tell what there is<br>L: tell what you see ✓ | M1 | T: i observe orange<br>L: orange ✓ | G1 | T: there is orange<br>L: orange ✓ |
| I1 | T: i observe lemon<br>L: lemon ✓ | C3 | T: tell what there is<br>L: orange ✓ | C1 | T: i can observe orange<br>L: orange ✓ |
| I2 | T:<br>L: lemon ✓<br>SUCCESS | C2 | L: orange ✓<br>SUCCESS | C3 | T: tell what it is<br>L: this is blueberry ✓<br>SUCCESS |
| E3 | T: i can see grape<br>L: grape ✓ | O1 | T: what<br>L: tell what you observe ✓ | K3 | T: it is coconut<br>L: i can see coconut ✓ |
| N1 | T:<br>L: tell what you observe ✓ | O1 | T: i can see avocado<br>L: avocado ✓ | N1 | T: this is pumpkin<br>L: i can see pumpkin ✓ |
| N1 | T: i can see pumpkin<br>L: pumpkin ✓ | K1 | T: this is coconut<br>L: coconut ✓ | K2 | T: what is it<br>L: i can see pumpkin ✗ |
| E2 | T:<br>L: grape ✓<br>SUCCESS | O2 | T: what is there<br>L: this is avocado ✓<br>SUCCESS | N2 | T: what do you see<br>L: i can see pumpkin ✓<br>FAILURE | where:
- Cn = a version of an image of an orange
- En = a version of an image of grapes
- Gn = a version of an image of blueberries
- In = a version of an image of a lemon
- Kn = a version of an image of a coconut
- Ln = a version of an image of a watermelon
- Mn = a version of an image of cherries
- Nn = a version of an image of a pumpkin
- On = a version of an image of an avocado

FIG. 13D

SYSTEMS AND METHODS FOR INTERACTIVE LANGUAGE ACQUISITION WITH ONE-SHOT VISUAL CONCEPT LEARNING THROUGH A CONVERSATIONAL GAME

BACKGROUND

A. Technical Field

The present disclosure relates generally to systems and methods for computer learning that can provide improved computer performance, features, and uses.

B. Background

Language is one of the most natural forms of communication for human and is typically viewed as fundamental to human intelligence; therefore, it is crucial for an intelligent agent to be able to use language to communicate with human as well. While supervised training with deep neural networks has led to encouraging progress in language learning, it suffers from the problem of capturing mainly the statistics of training data, and from a lack of adaptiveness to new scenarios and being flexible for acquiring new knowledge without inefficient retraining or catastrophic forgetting. Moreover, supervised training of deep neural network models needs a large number of training samples while many interesting applications require rapid learning from a small amount of data, which poses an even greater challenge to the supervised setting.

Accordingly, what is needed are systems and methods for interactive language acquisition with concept learning in an interactive setting that improves the functioning of computing devices for machine learning.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

FIG. 9 depicts test performance for the word-level task without image variations according to embodiments of the present document.

FIG. 10 depicts test success rate and reward for the word-level task on the Fruit dataset under different test image variation ratios according to embodiments of the present document.

FIGS. 13A-13D depict example dialogues from different approaches according to embodiments of the present document.

DETAILED DESCRIPTION OF EMBODIMENTS

Figure 1:
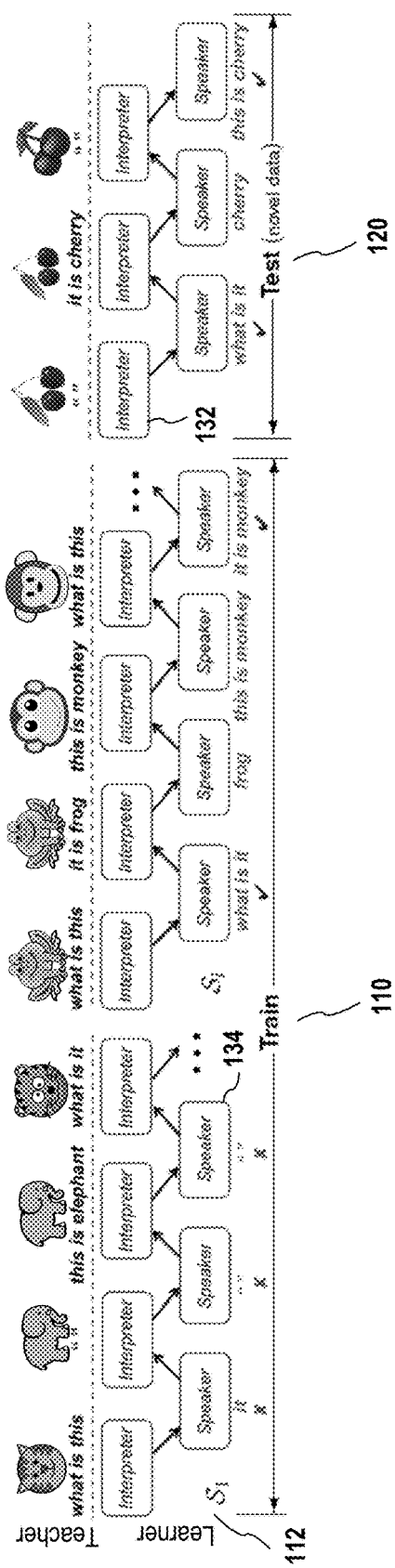
FIG. 1 graphically depicts an example conversational game for interactive language and one-shot concept learning according to embodiments of the present document.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

Language is one of the most natural forms of communication for human and is typically viewed as fundamental to human intelligence; therefore it is crucial for an intelligent agent to be able to use language to communicate with human as well. While supervised training with deep neural networks has led to encouraging progress in language learning, it suffers from the problem of capturing mainly the statistics of training data, and from a lack of adaptiveness to new scenarios and being flexible for acquiring new knowledge without inefficient retraining or catastrophic forgetting. Moreover, supervised training of deep neural network models needs a large number of training samples while many interesting applications require rapid learning from a small amount of data, which poses an even greater challenge to the supervised setting.

In contrast, humans learn in a way very different from the supervised setting. First, humans act upon the world and learn from the consequences of their actions. While for mechanical actions such as movement, the consequences mainly follow geometrical and mechanical principles, for language, humans act by speaking, and the consequence is typically a response in the form of verbal and other behavioral feedback (e.g., nodding) from the conversation partner (i.e., teacher). These types of feedback typically contain informative signals on how to improve language skills in subsequent conversations and play an important role in humans' language acquisition process. Second, humans have shown a celebrated ability to learn new concepts from small amount of data. From even just one example, children seem to be able to make inferences and draw plausible boundaries between concepts, demonstrating the ability of one-shot learning.

The language acquisition process and the one-shot learning ability of human beings are both impressive as a manifestation of human intelligence, and are inspiring for designing novel settings and algorithms for computational language learning. In one or more embodiments, conversation is leveraged as both an interactive environment for language learning and a natural interface for acquiring new knowledge. Approaches for interactive language acquisition with one-shot concept learning ability are presented herein. These approaches allow an agent to learn grounded language from scratch, acquire the transferable skill of actively seeking and memorizing information about novel objects, and develop the one-shot learning ability, purely through conversational interaction with a teacher.

B. Some Related Work

Supervised Language Learning. Deep neural network-based language learning has seen great success on many applications, including machine translation, dialogue generation, image captioning and visual question answering. For training, a large amount of labeled data is needed, requiring significant efforts to collect. Moreover, this setting essentially captures the statistics of training data and does not respect the interactive nature of language learning, rendering it less flexible for acquiring new knowledge without retraining or forgetting.

Reinforcement Learning for Sequences. Some recent studies used reinforcement learning (RL) to tune the performance of a pre-trained language model according to certain metrics. The work in this patent document is also related to RL in natural language action space and has a motivation to explore language learning through pure textual dialogues. However, in some of the aforementioned works, a set of candidate sequences is provided and the action is to select one from the set. One of the main focuses herein is rather on learning language from scratch: the agent has to learn to generate a sequence action rather than to simply select one from a provided candidate set.

Communication and Emergence of Language. Recent studies have examined learning to communicate and invent language. The emerged language needs to be interpreted by humans via post-processing. Embodiments herein, however, aim to achieve language learning from the dual perspectives of understanding and generation, and the speaking action of the agent is readily understandable without any post-processing. Some studies on language learning have used a guesser-responder setting in which the guesser tries to achieve the final goal (e.g., classification) by collecting additional information through asking the responder questions. These works try to optimize the question being asked to help the guesser achieve the final goal, while one or the focuses herein is on transferable speaking and one-shot ability.

One-Shot Learning and Active Learning. One-shot learning has been investigated in some recent works. The memory-augmented network stores visual representations mixed with ground truth class labels in an external memory for one-shot learning. A class label is always provided following the presentation of an image; thus the agent receives information from the teacher in a passive way. Some have presented efforts toward active learning, using a vanilla recurrent neural network (RNN) without an external memory. Both lines of study focus on image classification only, meaning the class label is directly provided for memorization. In contrast, this disclosure targets language and one-shot learning via conversational interaction, and the learner has to learn to extract important information from the teacher's sentences for memorization.

C. Embodiments of Conversational Game

In one or more embodiments, a conversational game inspired by experiments on studying language development in infants from cognitive science is constructed. FIG. 1 depicts an example conversational game for interactive language and one-shot concept learning according to embodiments of the present document. The conversational game 100 provides an environment for an agent (a term interchangeably with a learner hereinafter) to learn language and develop the one-shot learning ability. One-shot learning here means that during a session, no further training happens to the agent and it is expected to answer teacher's questions correctly about novel images of never-before-seen classes after being taught only once by the teacher, as illustrated in FIG. 1. The conversational game 100 comprises a training period 110 and a test period 120 following the training period 110. The training period 110 and/or the test period 120 may comprise one or more sessions. Within a training session $S_t$, the teacher may ask questions, answer learner's questions, make statements, or say nothing. The teacher also provides reward feedback based on learner's responses as (dis-)encouragement. The learner alternates between interpreting teacher's sentences and generating a response through an interpreter 132 and a speaker 134. As shown in FIG. 1, the learner can barely say anything meaningful initially. With one or more training sessions, it can produce meaningful responses for interaction. In the testing period 120 after training, when confronted with an image of cherry, which is a novel class that the learner never saw before during training, the learner can ask a question about it ("what is it") and generate a correct statement ("this is cherry") for another instance of cherry after only being taught once.

To succeed in this game, the agent has to learn to 1) speak by generating sentences; 2) extract and memorize useful information with only one exposure and use it in subsequent conversations; and 3) behave adaptively according to context and its own knowledge (e.g., asking questions about unknown objects and answering questions about something known); all achieved through interacting with the teacher. This makes the disclosed conversational game distinct from other games, in which the agent cannot speak or "speaks" by selecting a candidate from a provided set rather than generating sentences by itself, or games mainly focus on slow learning and falls short on one-shot learning.

Figure 2:
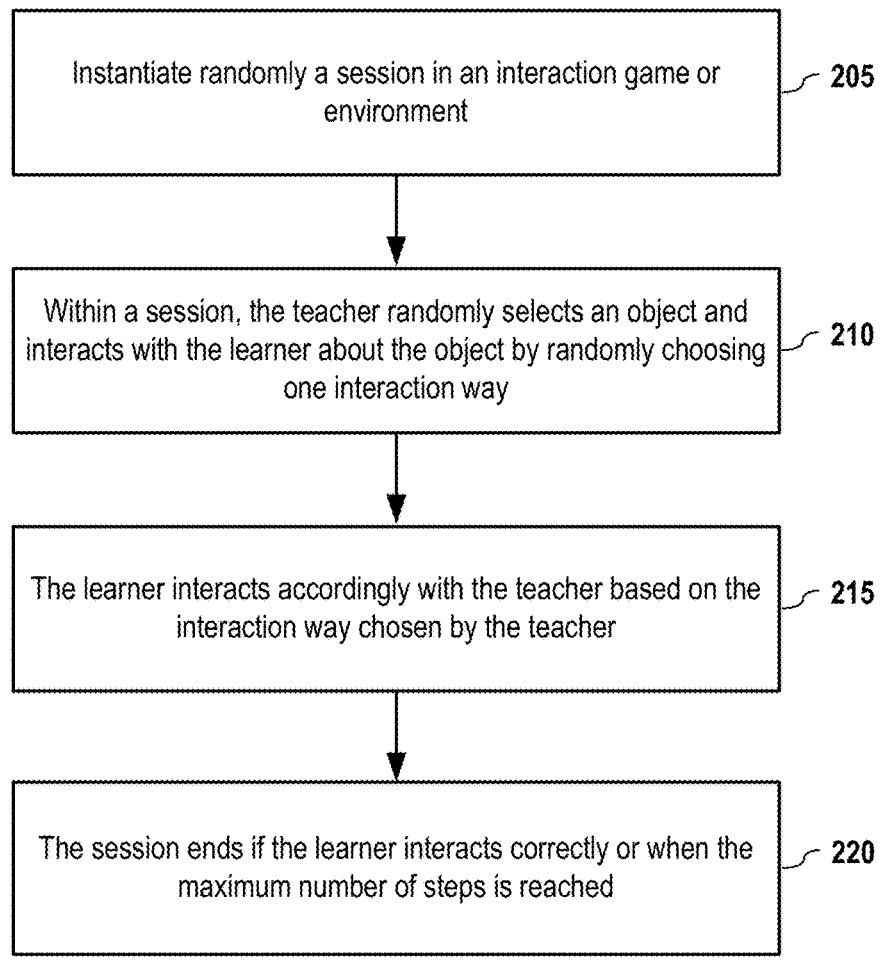
FIG. 2 depicts a process for interactive language and one-shot concept learning according to embodiments of the present document.

FIG. 2 depicts a process for interactive language and one-shot concept learning according to embodiments of the present document. In step 205, sessions ($S_t$) are randomly instantiated in this game during interaction. Testing sessions are constructed with a separate dataset with concepts that never appear before during training to evaluate the language and one-shot learning ability.

In step 210, within a session, the teacher randomly selects an object and interacts with the learner about the object by randomly choosing one interaction way from the following: 1) posing a question (e.g., "what is this"), 2) saying nothing (i.e., " ") or 3) making a statement (e.g., "this is monkey").

In step 215, the learner interacts accordingly with the teacher based on the interaction way chosen by the teacher. For example, when the teacher asks a question or says nothing: i) if the learner raises a question, the teacher will provide a statement about the object asked (e.g., "it is frog") with a question-asking reward (e.g. +0.1); ii) if the learner says nothing, the teacher will still provide an answer (e.g., "this is elephant") but with an incorrect reply reward (e.g. −1) to discourage the learner from remaining silent; and iii) for all other incorrect responses from the learner, the teacher will provide an incorrect-reply reward and move on to the next random object for interaction. When the teacher generates a statement, the learner will receive no reward if a correct statement is generated otherwise an incorrect-reply reward will be given.

In step 220, the session ends if the learner interacts correctly, such as answering the teacher's question correctly, generating a correct statement when the teacher says nothing (receiving a correct-answer reward +1), or when the maximum number of interaction steps is reached.

A success is reached if the learner behaves correctly during the whole session: asking questions about novel objects, generating answers when asked, and making statements when the teacher says nothing about objects that have been taught within the session. Otherwise it is a failure.

D. Embodiments of Interactive Language Acquisition Via Joint Imitation and Reinforcement Motivation. A goal is to learn to converse and develop the one-shot learning ability by conversing with a teacher and improving from teacher's feedback. One or more embodiments herein use a joint imitation and reinforce approach to achieve this goal. Imitation helps the agent to develop the basic ability to generate sensible sentences. As learning is done by observing the teacher's behaviors during conversion, the agent essentially imitates the teacher from a third-person perspective rather than imitating an expert agent who is conversing with the teacher. During conversations, the agent perceives sentences and images without any explicit labeling of ground truth answers, and it has to learn to make sense of raw perceptions, extract useful information, and save it for later use when generating an answer to teacher's question. While it is tempting to purely imitate the teacher, the agent trained this way only develops echoic behavior, i.e., mimicry. Reinforce leverages confirmative feedback from the teacher for learning to converse adaptively beyond mimicry by adjusting the action policy. It enables the learner to use the acquired speaking ability and adapt it according to reward feedback. This is analogous to some views on the babies' language-learning process that babies use the acquired speaking skills by trial and error with parents and improve according to the consequences of speaking actions. The fact that babies do not fully develop the speaking capabilities without the ability to hear, and that it is hard to make a meaningful conversation with a trained parrot, signifies the importance of both imitation and reinforcement in language learning.

Formulation. In embodiments, the agent's response may be modeled as a sample from a probability distribution over the possible sequences. Specifically, for one session, given the visual input $v^t$ and conversation history $\mathcal{H}^t = \{w^1, a^1, \ldots, w^t\}$, the agent's response $a^t$ can be generated by sampling from a distribution of the speaking action $a^t \sim p_\theta^s(a| \mathcal{H}^t, v^t)$. The agent interacts with the teacher by outputting the utterance $a^t$ and receives feedback from the teacher in the next step, with $w^{t+1}$ sentence as verbal feedback and $r^{t+1}$ reward feedback (with positive values as encouragement while negative values as discouragement, according to $a^t$, as described in Section C). Central to the goal is learning $p_\theta^s(\cdot)$. The problem is formulated as the minimization of a cost function $\mathcal{L}_\theta$ (which is a sum of imitation cost function $\mathcal{L}_\theta^I$ and reinforce cost function $\mathcal{L}_\theta^R$) as:

$$\mathcal{L}_\theta = \underbrace{\mathbb{E}_W\left[-\sum_t \log p_\theta^I(w^t | \cdot)\right]}_{\text{Imitation } \mathcal{L}_\theta^I} + \underbrace{\mathbb{E}_{p_\theta^S}\left[-\sum_t [\gamma]^{t-1} \cdot r^t\right]}_{\text{Reinforce } \mathcal{L}_\theta^R} \quad (1)$$

where $\mathbb{E}_w(\cdot)$ is the expectation over all the sentences W from teacher, $\gamma$ is a reward discount factor, and $[\gamma]^t$ denotes the exponentiation over $\gamma$. While the imitation term learns directly the predictive distribution $p_\theta^l(w^t|\mathcal{H}^{t-1}, a^t)$, it contributes to $p_\theta^s(\bullet)$ through parameter sharing between them.

Figure 3:
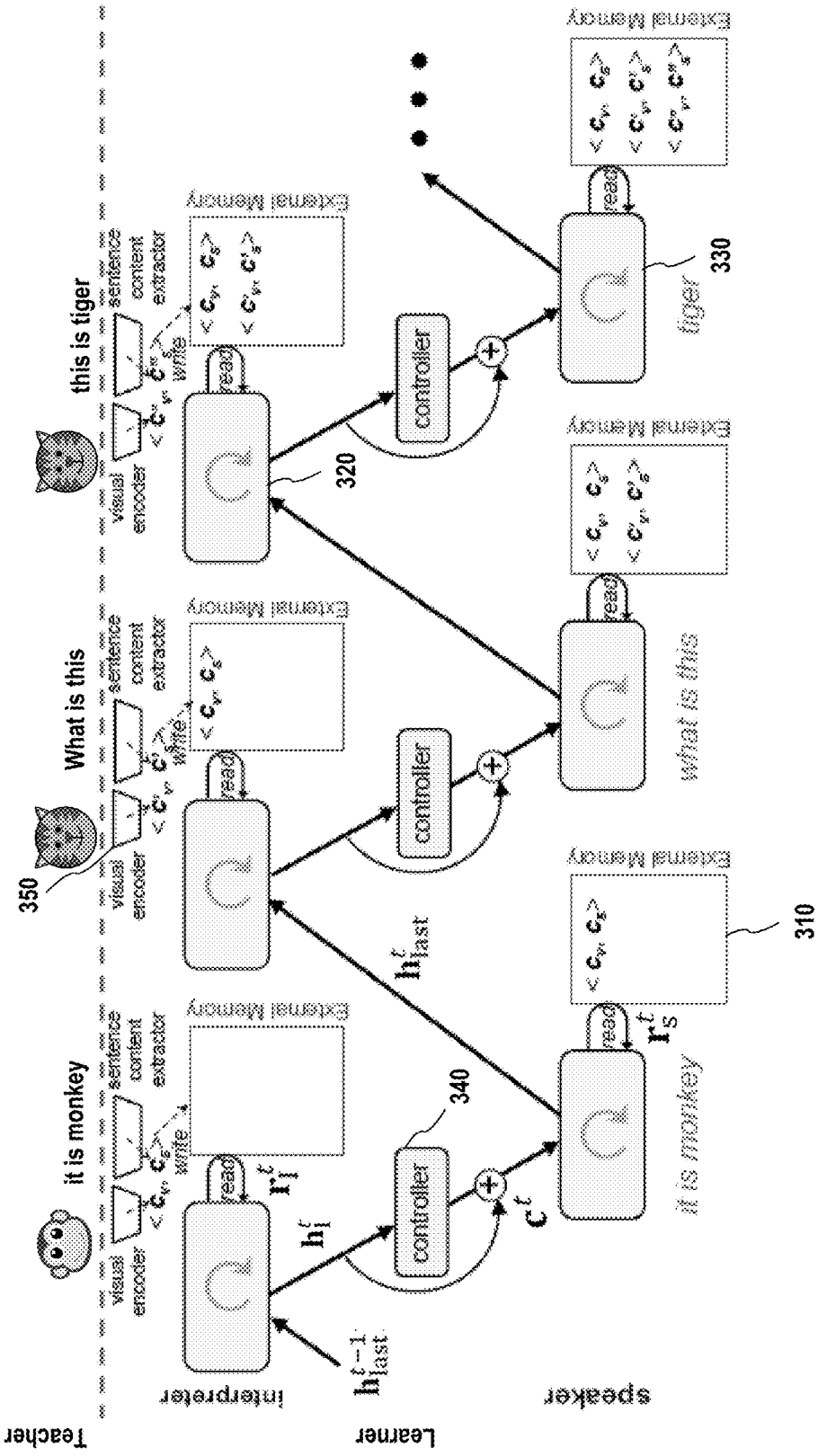
FIG. 3 graphically depicts a network structure for implementing the interactive language and one-shot concept learning according to embodiments of the present document.

Architecture. In one or more embodiments, the learner comprises four major components: an external memory 310, an interpreter 320, a speaker 330, a controller 340, and a visual encoder 350, as shown in FIG. 3. The external memory 310 is flexible for storing and retrieving information, making it a component of the disclosed network for one-shot learning. The interpreter 320 is responsible for interpreting the teacher's sentences, extracting information from the perceived signals, and saving it to the external memory. The speaker 330 is in charge of generating sentence responses with reading access to the external memory. The response could be a question asking for information or a statement answering a teacher's question, leveraging the information stored in the external memory. The controller 340 modulates the behavior of the speaker to generate responses according to context (e.g., the learner's knowledge status). The visual encoder 350 takes an input image and outputs a visual feature representation. In one or more embodiments, the visual feature representation is a visual feature vector, a visual feature matrix, or other applicable formats. In some embodiments, it is implemented as a convolutional neural network (CNN) followed by fully connected (FC) layers. For a novel image input, the visual feature vector $k_v$ computed from the novel image is saved as a visual content $c_v$ (visual modality), together with sentence content $c_s$ (sentence modality) extracted using a sentence content extractor from the teacher's sentence input with attention mechanism associating to the visual modality $c_v$ into the external memory as a pair $<c_v, c_s>$. In one or more embodiments, the sentence content $c_s$ is a mixture of word embedding vectors. In some embodiments, for an image input with a sentence input, a content importance gate $g_{mem}$ is used to adaptively control whether the content c ($c_v$, $c_s$) should be written into memory. More details of memory written operation may be referred to Section H.2 and equations (5)-(7). It shall be understood that the sentence content extractor shown in FIG. 3 is depicted for the convenience of showing the process of saving $<c_v, c_s>$ as a multimodal pair into the memory 310. In one or more embodiments, the sentence content extractor is part of the interpreter.

Figure 4:
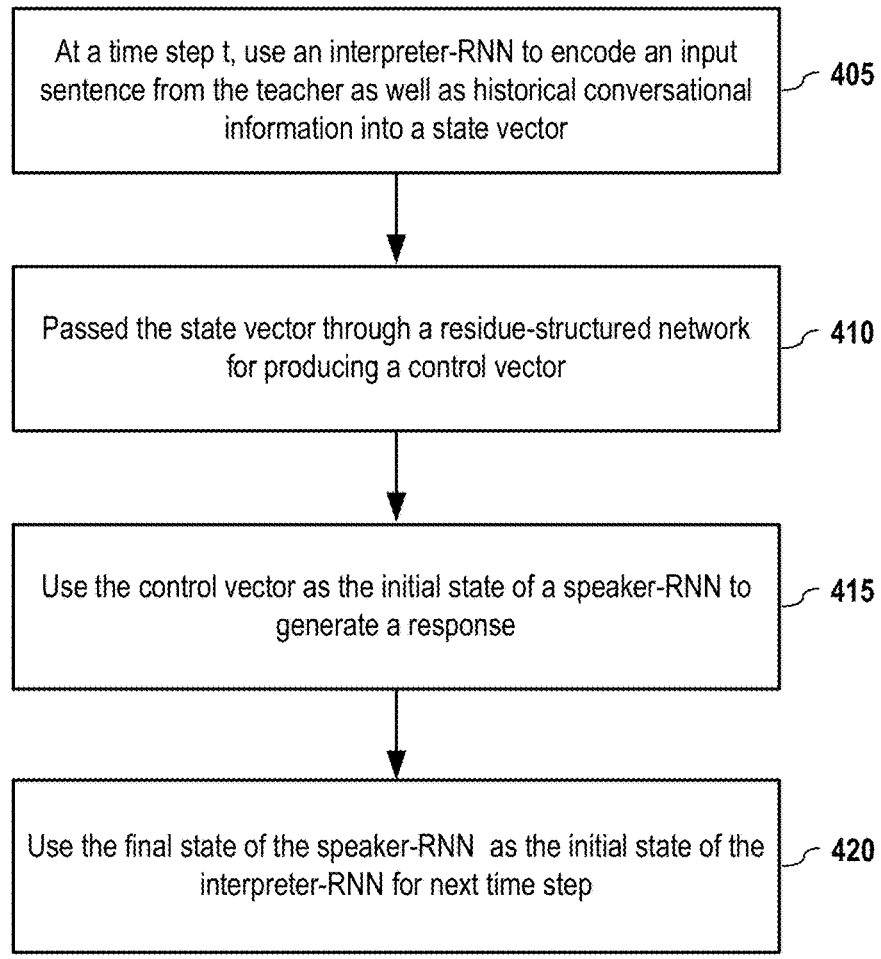
FIG. 4 depicts a process for implementing one-shot concept learning with the network structure according to embodiments of the present document.
Figure 5:
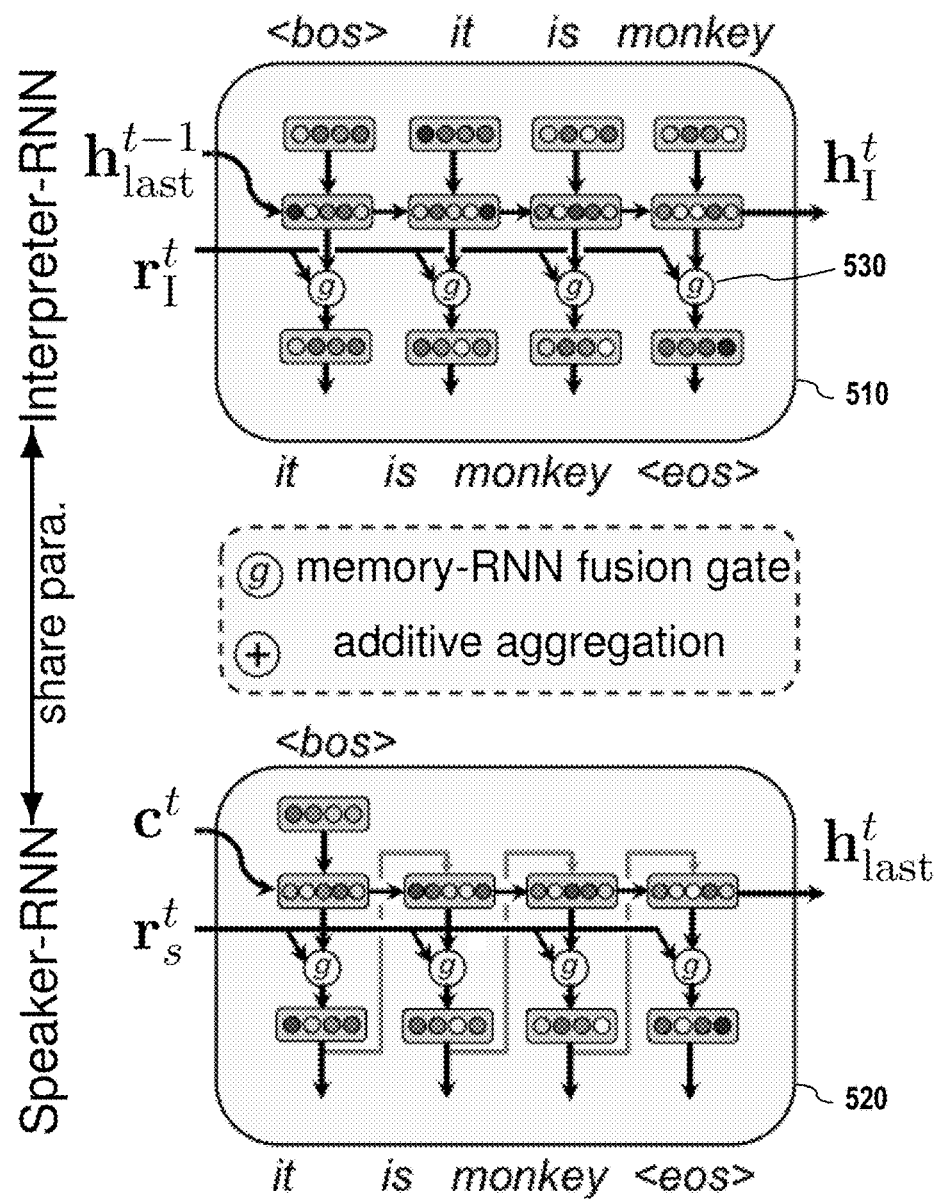
FIG. 5 graphically depicts an interpreter-RNN and a speaker-RNN for implementing the interactive language and one-shot concept learning according to embodiments of the present document.

FIG. 4 depicts a process for implementing one-shot concept learning with the network structure according to embodiments of the present document. In step 405, at a time step t, the interpreter uses an interpreter-RNN (graphically depicted shown in FIG. 5, which is also referred as a first RNN hereinafter) to encode a natural language input $w^t$ comprising zero or more words from the teacher as well as historical conversational information into a state vector $h_I^t$. In some embodiments, the natural language input is a natural language sentence. It shall be noted that references to "sentence" shall be understood to mean any set of zero or more words whether or not they form a proper, complete sentence in a formal sense; neither does a "sentence" as used herein require correct capitalization and/or punctuation. The zero word corresponds to the situation when the teacher presents an image and says nothing. In FIG. 5, the symbol <bos> represents beginning-of-sentence (i.e., beginning of the natural language phrase) and the symbol <eos> represents end-of-sentence (i.e., end of the natural language phrase). The visual perception is also encoded and used as a key to retrieve information from the external memory. In embodiments, the interpreter-RNN will update the external memory with an importance weighted information extracted from the perception input. In step 410, $h_I^t$ is passed through a residue-structured network, which is an identity mapping augmented with a learnable controller $f(\bullet)$ for producing a control vector $c^t$. In embodiments, the control vector $c^t$ may be obtained by combining (e.g. adding) the controller's output to the input of the controller ($h_I^t$). In step 415, control vector $c^t$ is used as the initial state of a speaker-RNN (graphically depicted in FIG. 5, which is also referred as a second RNN hereinafter) to generate the response $a^t$. In step 420, the final state $h_{last}^t$ of the speaker-RNN is used as the initial state of the interpreter-RNN at the next time step.

FIG. 5 graphically depicts an interpreter-RNN (or a first RNN) 510 and a speaker-RNN (or a second RNN) 520 for implementing the interactive language and one-shot concept learning according to embodiments of the present document. In embodiments, the interpreter-RNN 510 and the speaker-RNN 520 share parameters, and both comprise multiple fusion gates for operation. As shown in FIG. 5, the interpreter-RNN 510 receives input of the last state of the RNN at time step t-1 ($h_{last}^{t-1}$) and the vectors read out from the sentence contents under sentence modality of the external memory at time step t in the interpreter ($r_I^t$). The fusion gates in the speaker-RNN 520 receive inputs of the control vector $c^t$ and the vectors read out from the sentence contents under sentence modality of the external memory at time step t in the speaker ($r_s^t$). Memory read are defined in Equations (4) and (14).

1. Embodiments of Imitation with Memory Augmented Neural Network for Echoic Behavior The teacher's way of speaking provides a source for the agent to imitate. For example, the syntax for composing a sentence is a useful skill the agent can learn from the teacher's sentences, which could benefit both interpreter and speaker. Imitation is achieved by predicting teacher's future sentences with interpreter and parameter sharing between interpreter and speaker.

Figure 6:
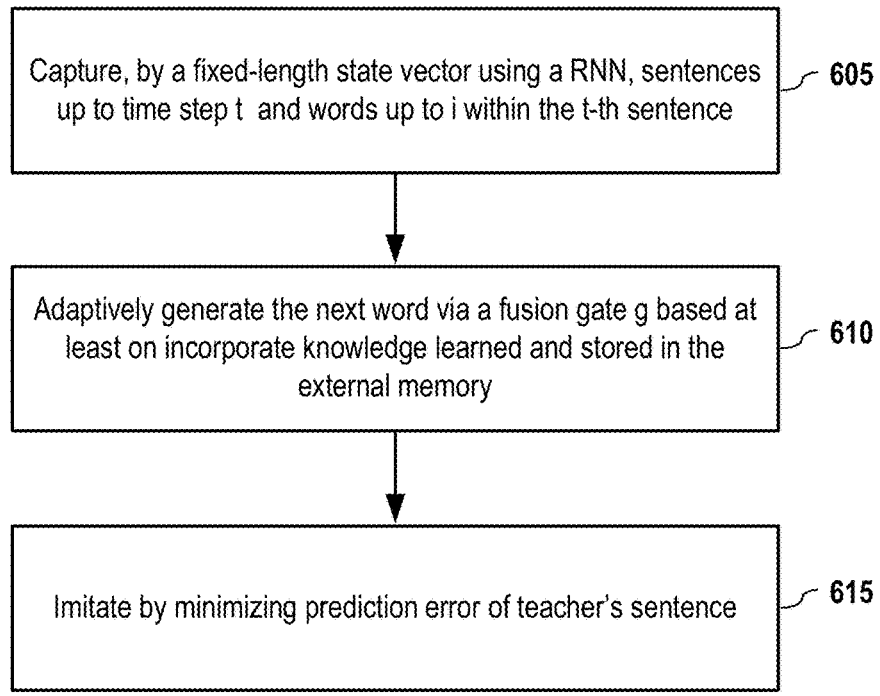
FIG. 6 depicts a method for imitation with memory augmented neural network according to embodiments of the present document.

FIG. 6 depicts a method for imitation with memory augmented neural network according to embodiments of the present disclosure. For prediction, the probability of the next sentence $w^t$ conditioned on the image $v^t$ as well as previous sentences from both the teacher and the learner $\{w^1, a^1, \ldots, w^{t-1}, a^{t-1}\}$ may be represented as:

$$p_\theta^I(w^t|\mathcal{H}^{t-1}, a^{t-1}, v^t) = \Pi_i p_\theta^I(w_i^t|w_{1:i-1}^t, h_{last}^{t-1}, v^t) \quad (2)$$

where $h_{last}^{t-1}$ is the last state of the RNN at time step t-1 as the summarization of $\{\mathcal{H}^{t-1}, a^{t-1}\}$ (c.f., FIG. 3) and i indexes words within a sentence.

In one or mode embodiments, the probability of the i-th word in the t-th sentence is modeled with an RNN, where the sentences up to t and words up to i within the t-th sentence are captured (605) by a fixed-length state vector $h_i^t$=RNN ($h_{i-1}^t$, $w_i^t$). In one or more embodiments, to incorporate knowledge learned and stored in the external memory, the next word is adaptively generated (610) based on i) the predictive distribution $p_\theta^I$ of the next word from the state of the RNN to capture the syntactic structure of sentences, and ii) the information from the external memory to represent the previously learned knowledge, via a fusion gate g:

$$p_\theta^I(w_i^t|h_i^t, v^t) = (1-g) \cdot p_h + g \cdot p_r \quad (3)$$

where $p_h$=softmax($E^T f_{MLP}(h_i^t)$) and $p_r$=softmax($E^T r$). $E \in \mathbb{R}^{d \times k}$ is the word embedding table, with d the embedding dimension and k the vocabulary size. r is a vector read out from the external memory using a visual key as detailed in the next section. $f_{MLP}(\bullet)$ is a multi-layer Multi-Layer Perceptron (MLP) for bridging the semantic gap between the RNN state space and the word embedding space. In embodiments, the fusion gate g is computed as $g=f(h_I^t, c)$, where c is the confidence score $c=\max(E^T r)$, and a well-learned concept should have a large score by design (Section G). In step 615, the learner or agent imitates by minimizing prediction error of teacher's sentence.

Multimodal Associative Memory Embodiments. In one or more embodiments, a multimodal memory is used for storing visual (v) and sentence (s) features with each modality while preserving the correspondence between them. Compared to single modality memory, information organization is more structured and cross modality retrieval is straightforward under this design. Given a visual key $K_v$ computed from the current visual image (c.f., Section G), the corresponding vector or sentence feature may be retrieved from the memory as $$r \leftarrow \text{READ}(K_v, M_v, M_s) \quad (4)$$

In one or more embodiments, $M_v$ and $M_s$ are memories for visual and sentence modalities with the same number of slots (columns). Memory read may be implemented as $r=M_s\alpha$ with $\alpha$ a soft reading weight obtained through the visual modality by calculating the cosine similarities between $K_v$ and slots of $M_v$.

Memory write may be similar to Neural Turing Machine, but with a content importance gate $g_{mem}$ to adaptively control whether the content c should be written into memory:

$$M_m \leftarrow W_{\text{RITE}}(M_m, c_m, g_{mem}), m \in \{v, s\} \quad (5)$$

For the visual modality $c_v \triangleq k_v$. For the sentence modality, $c_s$ has to be selectively extracted from the sentence generated by the teacher. In one or more embodiments, an attention mechanism is used to achieve this with $c_s=W\gamma$, where W denotes the matrix with columns being the embedding vectors of all the words in the sentence. $\gamma$ is a normalized attention vector representing the relative importance of each word in the sentence as measured by the cosine similarity between the sentence representation vector and each word's context vector, computed using a bidirectional-RNN. In embodiments, the scalar-valued content importance gate $g_{mem}$ is computed as a function of the sentence from the teacher, meaning that the importance of the content to be written into memory depends on the content itself (c.f., Section H for more details). The memory write may be achieved with an erase and an add operation:

$$\tilde{M}_m = M_m - M_m \odot (g_{mem} \cdot 1 \cdot \beta^T) \quad (6)$$

$$M_m = \tilde{M}_m + g_{mem} \cdot c_m \cdot \beta^T, m \in \{v, s\} \quad (7)$$

$\odot$ denotes Hadamard product and the write location/may be determined with a Least Recently Used Access mechanism.

2. Embodiments of Context-Adaptive Behavior Shaping Through Reinforcement Learning Imitation fosters the basic language ability for generating echoic behavior, but it is not enough for conversing adaptively with the teacher according to context and the knowledge state of the learner. In embodiments, reward feedback is leveraged to shape the behavior of the agent by optimizing the policy using RL. The agent's response $a^t$ at is generated by the speaker, which can be modeled as a sample from a distribution over all possible sequences, given the conversation history $\mathcal{H}^t=\{w^1, a^1, \ldots, w^t\}$ and visual input $v^t$:

$$a^t \sim p_\theta^s(a | \mathcal{H}^t, v^t) \quad (8)$$

As $\mathcal{H}^t$ may be encoded by the interpreter-RNN as $h_I^t$, the action policy corresponding to speaker RNN can be represented as $p_\theta^s(a|h_I^t, v^t)$. To leverage the language skill that is learned via imitation through the interpreter, the sentence may be generated by implementing the speaker with an RNN, sharing parameters with the interpreter-RNN, but with a conditional signal modulated by a controller network (FIG. 3):

$$p_\theta^s(a^t|h_I^t, v^t) = p_\theta^I(a^t|h_I^t + f(h_I^t, c), v^t) \quad (9)$$

The reason for using a controller $f(\cdot)$ for modulation is that the basic language model only offers the learner the echoic ability to generate a sentence, but not necessarily the adaptive behavior according to context (e.g., asking questions when facing novel objects and providing an answer for a previously learned object according to its own knowledge state). Without any additional module or learning signals, the agent's behaviors would be the same as those of the teacher because of parameter sharing; thus, it is difficult for the agent to learn to speak in an adaptive manner.

Figure 7:
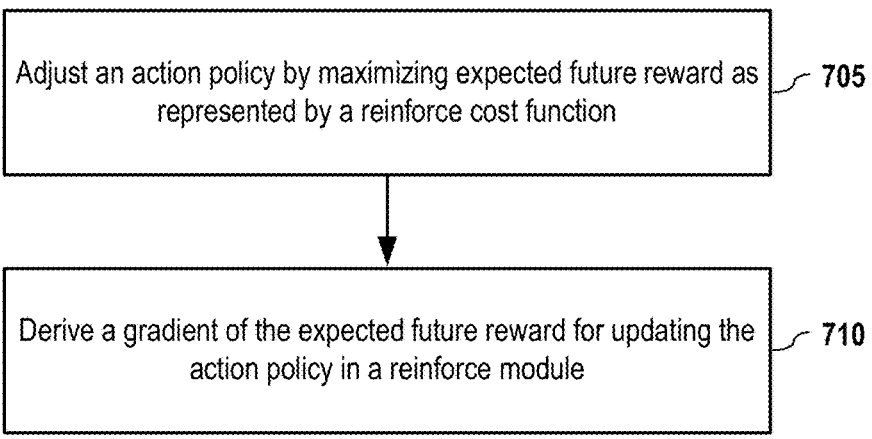
FIG. 7 depicts a method for context-adaptive behavior shaping according to embodiments of the present document.

FIG. 7 depicts a method for context-adaptive behavior shaping according to embodiments of the present document. In step 705, to learn from consequences of speaking actions, the action policy $p_\theta^s(\cdot)$ is adjusted by maximizing expected future reward as represented by a reinforce cost function $\mathcal{L}_\theta^R$. As a non-differentiable sampling operation is involved in Equation (8), policy gradient theorem is used to derive the gradient for updating $p_\theta^s(\cdot)$ in step 710 in the reinforce module:

$$\nabla_\theta \mathcal{L}_{\theta R} = \mathbb{E}_{p_\theta^s}[\Sigma_t A^t \cdot \nabla_\theta \log p_\theta^s(a^t|c^t)] \quad (10)$$

where $A^t = V(h_I^t, c^t) - r^{t+1} - \gamma V(h_I^{t+1}, c^{t+1})$ is the advantage estimated using a value network $V(\cdot)$. The imitation module contributes by implementing an imitation cost function $\mathcal{L}_\theta^I$ with a cross entropy loss and minimizing it with respect to the parameters in predictive distribution $p_\theta^I(\cdot)$, which are shared with $p_\theta^s(\cdot)$. The training signal from imitation takes the shortcut connection without going through the controller. More details on $f(\cdot)$, $V(\cdot)$, and training are provided in Section G.

E. Some Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

In this disclosure, experiments were conducted with comparison to baseline approaches. Experiment was first done with a word-level task in which the teacher and the learner communicate a single word each time. The impact of image variations on concept learning was then investigated. Evaluation was further performed on the more challenging sentence-level task in which the teacher and the agent communicate in the form of sentences with varying lengths.

Setup. To evaluate the performance in learning a transferable ability, rather than the ability of fitting a particular dataset, an Animal dataset was used for training and the trained models was tested on a Fruit dataset (FIG. 1). More details on the datasets are provided in Section F. Each session comprised two randomly sampled classes, and the maximum number of interaction steps was six.

Baselines. The following methods compared:
Reinforce: a baseline model with the same network structure as a model embodiment herein and trained using RL only, i.e. minimizing $\mathcal{L}_\theta^R$, Imitation: a recurrent encoder decoder model and trained via imitation (minimizing $\mathcal{L}_\theta^R$);

Imitation+Gaussian-RL: a joint imitation and reinforcement method using a Gaussian policy in the latent space of the control vector $c^r$. The policy is changed by modifying $c^r$ the action policy depends upon.

1. Word-Level Task

In this experiment, a focus was on a word-level task, which offers an opportunity to analyze and understand the underlying behavior of different algorithms while being free from distracting factors. Note that although the teacher speaks a word each time, the learner still has to learn to generate a full-sentence ended with an end-of-sentence (e.g., <eos>) symbol.

Figure 8:
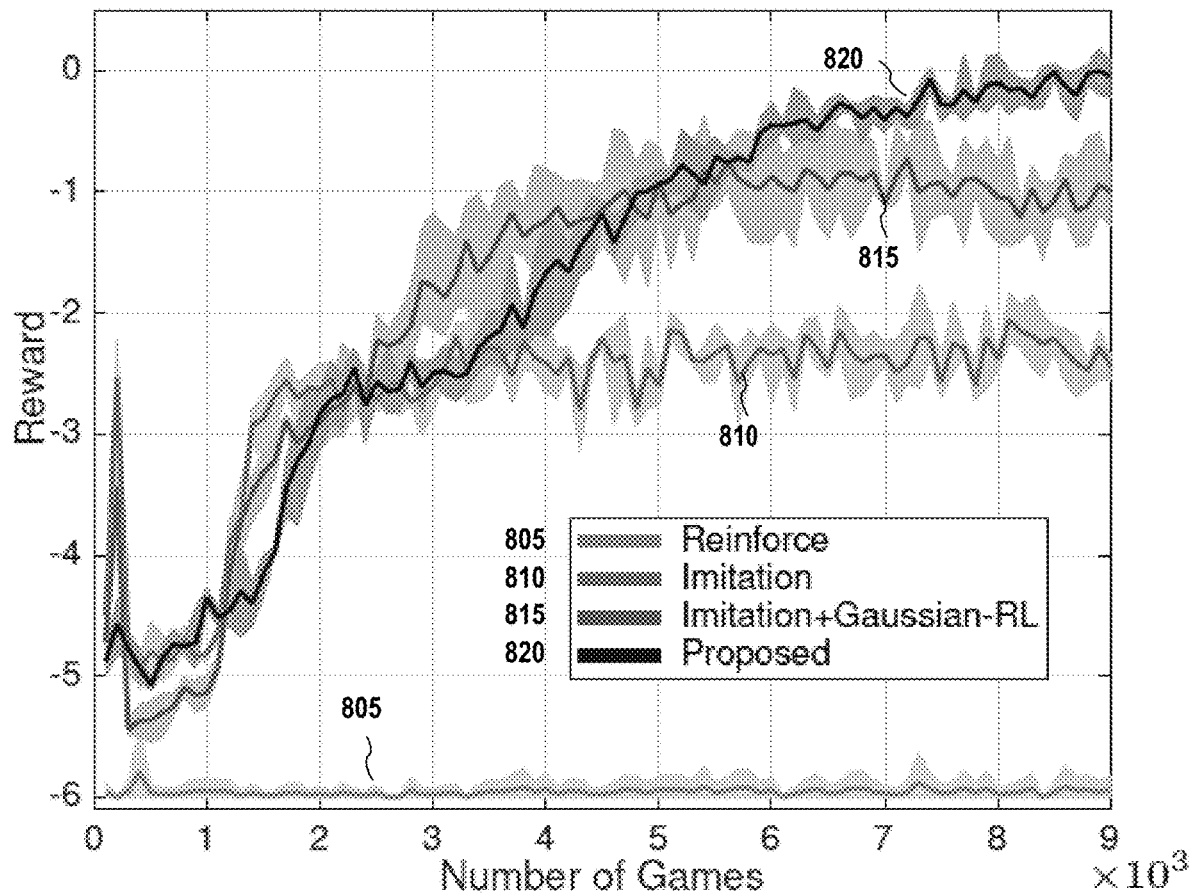
FIG. 8 depicts graphically evolution of reward during training for the word-level task without image variations according to embodiments of the present document.

FIG. 8 shows the evolution curves of the rewards during training for different approaches. It is observed that Reinforce 805 makes very little progress, mainly due to the difficulty of exploration in the large space of sequence actions. Imitation 810 obtains higher rewards than Reinforce during training, as it can avoid some penalty by generating sensible sentences such as questions. Imitation+Gaussian-RL 815 gets higher rewards than both Imitation and Reinforce, indicating that the RL component reshapes the action policy toward higher rewards. However, as the Gaussian policy optimizes the action policy indirectly in a latent feature space, it is less efficient for exploration and learning. Proposed 820, which refers to an example of the models proposed herein, achieves the highest final reward during training.

The models were trained using the Animal dataset and evaluated them on the Fruit dataset; FIG. 9 summarizes the success rate and average reward over 1K testing sessions. As can be observed, Reinforce 905 achieves the lowest success rate (0.0%) and reward (−6.0) due to its inherent inefficiency in learning. Imitation 910 performs better than Reinforce in terms of both its success rate (28.6%) and reward value (−2.7). Imitation+Gaussian-RL 915 achieves a higher reward (−1.2) during testing but its success rate (32.1%) is similar to that of Imitation, mainly due to the rigorous criteria for success. Proposed 920, which refers to an example of the models proposed herein, reaches the highest success rate (97.4%) and average reward (+1.1) (the testing reward is higher than the training reward mainly due to the action sampling in training for exploration), outperforming all baseline methods by a large margin. From this experiment, it is clear that imitation with a proper usage of reinforcement is important for achieving adaptive behaviors (e.g., asking questions about novel objects and generating answers or statements about learned objects proactively).

2. Learning with Image Variations

To evaluate the impact of within-class image variations on one-shot concept learning, models were trained with and without image variations, and during testing compare their performance under different image variation ratios (the chance of a novel image instance being present within a session) as shown in FIG. 10. FIG. 10 depicts success rate and rewards under different variation ratio for different approaches, including Reinforce 1005, Imitation 1010, Imitation+Gaussian-RL 1015, and Proposed embodiment 1020. The test was done on the Fruit dataset under different test image variation ratios for models trained on the Animal dataset with a variation ratio of 0.5 (solid lines) and without variation (dashed lines).

It is observed that the performance of the model trained without image variations drops significantly as the variation ratio increases. The performance of models trained under a variation ratio of 0.5 was also evaluated. FIG. 10 clearly shows that although there is also a performance drop, which is expected, the performance degrades more gradually, indicating the importance of image variation for learning one-shot concepts.

In one or more embodiments, sampled training and testing images are represented by their corresponding features extracted using the visual encoder trained without and with image variations according to embodiments of the present patent document. In one or more embodiments, ten classes randomly sampled from an Animal dataset and a Fruit dataset, with features extracted using the visual encoder trained without and with image variations on the Animal dataset. Clusters of visually similar concepts emerge in the feature space when trained with image variations, indicating that a more discriminative visual encoder was obtained for learning generalizable concepts.

3. Sentence-Level Task

Figure 12:
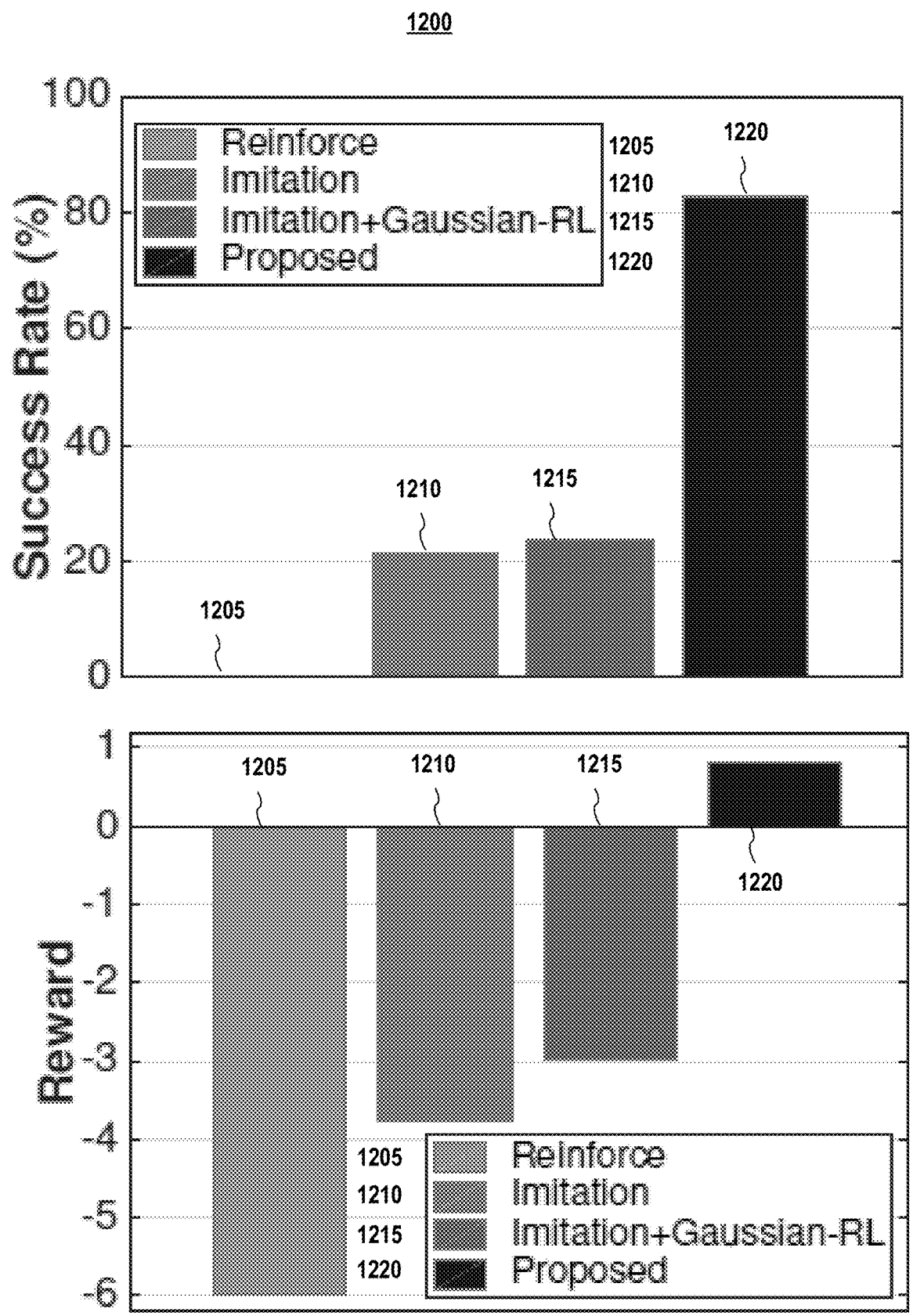
FIG. 12 depicts test performance for sentence-level task with image variations according to embodiments of the present document.

In this disclosure, the model on sentence-level tasks was further evaluated. Teacher's sentences have a number of variations with sentence lengths ranging from one to five. Example sentences from the teacher are presented in Section F. This task was more challenging than the word-level task in two ways: i) information processing is more difficult as the learner has to learn to extract useful information which could appear at different locations of the sentence; ii) the sentence generation was also more difficult than the word-level task and the learner had to adaptively fuse information from RNN and external memory to generate a complete sentence. Comparison of different approaches, including Reinforce 1205, Imitation 1210, Imitation+Gaussian-RL 1215, and Proposed 1220, which refers to an example embodiment, in terms of their success rates and average rewards on the novel test set are shown in FIG. 12. As can be observed from FIG. 12, Proposed 1220 again outperforms all other compared methods in terms of both success rate (82.8%) and average reward (+0.8), demonstrating its effectiveness even for the more complex sentence-level task.

Figure 11:
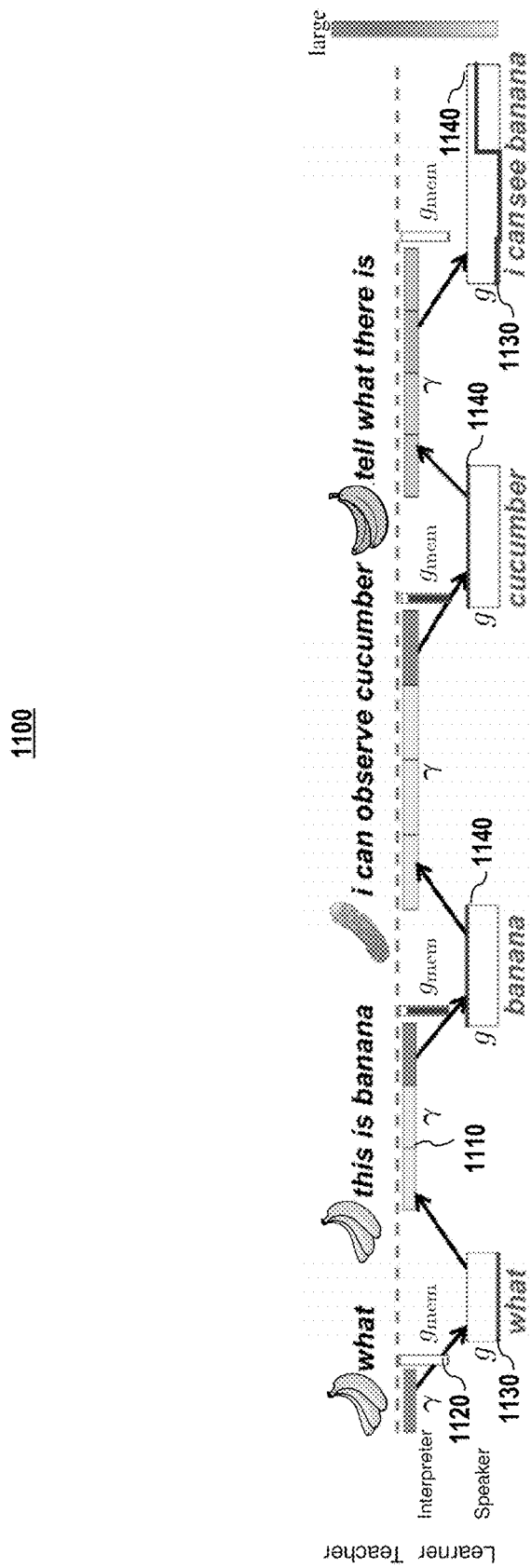
FIG. 11 graphically depicts example results of the proposed approach on novel classes according to embodiments of the present document.

This disclosure also visualizes the information extraction and the adaptive sentence composing process of the proposed approach when applied to a test set. FIG. 11 graphically depicts example results of the proposed approach on novel classes according to embodiments of the present document. The learner can ask about the new class and use the interpreter to extract useful information from the teacher's sentence 1110 via word-level attention $\gamma$ (darker color corresponding to higher attention) and content importance gate $g_{mem}$ 1120 jointly. The speaker uses the fusion gate g (shown as 530 in FIG. 5) to adaptively switch between signals from the speaker RNN (small g) 1130 and external memory (large g) 1140 to generate sentence responses. As shown in FIG. 11, the agent learns to extract useful information from the teacher's sentence and use the content importance gate to control what content is written into the external memory. Concretely, sentences containing object names have a larger $g_{mem}$ value, and the word corresponding to object name has a larger attention weight $\gamma$ compared to other words in the sentence. The combined effect of $\gamma$ and $g_{mem}$ suggests that words corresponding to object names have higher likelihoods of being written into the external memory. The agent also successfully learns to use the external memory for storing the information extracted from the teacher's sentence, to fuse it adaptively with the signal from the RNN (capturing the syntactic structure) and to generate a complete sentence with the new concept included. The value of the fusion gate g is small when generating words like "what,", "i," "can," and "see," meaning it mainly relies on the signal from the RNN for generation (c.f., Equation (3) and FIG. 11). In contrast, when generating object names (e.g., "banana" and "cucumber"), the fusion gate g has a large value, meaning that there is more emphasis on the signal from the external memory. This experiment showed that the proposed approach is applicable to the more complex sentence-level task for language learning and one-shot learning. More interestingly, it learns an interpretable operational process, which can be easily understood. More results including example dialogues from different approaches are presented in FIGS. 13A-13D.

F. Embodiments of Database and Example Sentences

TABLE 1

Object classes for two datasets

| Set | number of classes/ number of images | Object Names |
| --- | --- | --- |
| Animal | 40/408 | armadillo, bear, bull, butterfly, camel, cat, chicken, cobra, condor, cow, crab, crocodile, deer, dog, donkey, duck, elephant, fish, frog, giraffe, goat, hedge-hog, kangaroo, koala, lion, monkey, octopus, ostrich, panda, peacock, penguin, pig, rhinoceros, rooster, seahorse, snail, spider, squirrel, tiger, turtle |
| Fruit | 16/48 | apple, avocado, banana, blueberry, cabbage, cherry, coconut, cucumber, fig, grape, lemon, orange, pineapple, pumpkin, strawberry, watermelon |

TABLE 2

Example sentences from the teacher

| Category | Example Sentences |
| --- | --- |
| Empty | " " |
| Question | "what" <br> "what is it" <br> "what is this" <br> "what is there" <br> "what do you see" <br> "what can you see" <br> "what do you observe" <br> "what can you observe" <br> "tell what it is" <br> "tell what this is" <br> "tell what there is" <br> "tell what you see" <br> "tell what you can see" <br> "tell what you observe" <br> "tell what you can observe" |
| Answer/ Statement | "apple" <br> "it is apple" <br> "this is apple" <br> "there is apple" <br> "i see apple" <br> "i observe apple" <br> "i can see apple" <br> "i can observe apple" |

The Animal dataset contains 40 animal classes with 408 images in total, with about 10 images per class on average. The Fruit dataset contains 16 classes and 48 images in total with 3 images per class. The object classes and images are summarized in Table 1. Example sentences from the teacher in different cases (questioning, answering, and saying nothing) are presented in Table 2.

G. Embodiments of Network Details

The following provide example embodiments. However, it shall be referred that the various network components may be configured differently or use different subcomponents but still function within the spirit and scope of the present disclosure.

1. Visual Encoder

In embodiments, a visual encoder takes an input image and outputs a visual feature representation. In one or more embodiments, the visual feature representation is a visual feature vector, a visual feature matrix, or other applicable formats. It may be implemented as a convolutional neural network (CNN) followed by fully connected (FC) layers. In one or more embodiments, each CNN has four layers. Each layer has 32, 64, 128, 256 filters of size 3×3, followed by max-poolings with a pooling size of 3 and a stride of 2. The ReLU activation may be used for all layers. Two FC layers with output dimensions of 512 and 1024 are used after the CNN, with ReLU and a linear activations respectively.

2. Interpreter and Speaker

Interpreter and speaker are implemented with interpreter-RNN and speaker-RNN respectively and they share parameters. The RNN may be implemented using the Gated Recurrent Unit with a state dimension of 1024. Before inputting to the RNN, in one or more embodiments, word IDs are first projected to a word embedding vector of dimension 1024 followed with two FC layers with ReLU activations and a third FC layer with linear activation, all having output dimensions of 1024.

3. Fusion Gate

In embodiments, the fusion gate g is implemented as two fully connected (FC) layers with ReLU activations a third FC layer with a sigmoid activation. The output dimensions are 50, 10 and 1 for each layer respectively.

4. Controller

The controller $f(\bullet)$ together with the identity mapping forms a residue-structured network as:

$$c=h+f(h) \qquad (11)$$

In embodiments, $f(\bullet)$ is implemented as two FC layers with ReLU activations and a third FC layer with a linear activation, all having an output dimension of 1024.

5. Value Network

In embodiments, the value network is introduced to estimate the expected accumulated future reward. It takes the state vector of interpreter-RNN $h_I$ and the confidence c as input. It may be implemented as two FC layers with ReLU activations and output dimensions of 512 and 204 respectively. The third layer may be another FC layer with a linear activation and an output dimension of 1. It is trained by minimizing a cost as:

$$\mathcal{L}^V = \mathbb{E}_{p_\theta^s}(V(h_I^t, c^t) - r^{t+1} - \lambda V'(h_I^{t+1}, c^{t+1}))^2 \qquad (12)$$

$V'(\bullet)$ denotes a target version of the value network, whose parameters remain fixed until copied from $V(\bullet)$ periodically.

6. Confidence Score

The confidence score c is defined as follows:

$$c = \max(E^T r) \qquad (13)$$

where $E \in \mathbb{R}^{d \times k}$ is the word embedding table, with d the embedding dimension and k the vocabulary size. $r \in \mathbb{R}^d$ is the vector read out from the sentence modality of the external memory as:

$$r = M_s \alpha \qquad (14)$$

where α is a soft reading weight obtained through the visual modality by calculating the cosine similarities between $k_v$ and the slots of $M_v$. The content stored in the memory is extracted from teacher's sentence $\{w_1, w_2, \ldots, w_i, \ldots, w_n\}$ as (detailed in Section H):

$$c_s = [w_1, w_2, \ldots, w_i, \ldots, w_n]\gamma \qquad (15)$$

where $w_i \in \mathbb{R}^d$ denotes the embedding vector extracted from the word embedding table E for the word $w_i$. Therefore, for a well-learned concept with effective γ for information extraction and effective α for information retrieval, r should be an embedding vector mostly or mainly corresponding to the label word associated with the visual image. Therefore, the value of c should be large and the maximum is reached at the location where that label word resides in the embedding table. For a completely novel concept, as the memory contains no information about it, the reading attention α will not be focused and thus r would be an averaging of a set of existing word embedding vectors in the external memory, leading to a small c value.

H. Embodiments of Sentence Content Extraction and Importance Gate

The following provide example embodiments. However, it shall be referred that the various network components may be configured differently or use different subcomponents but still function within the spirit and scope of the present disclosure.

1. Content Extraction

In embodiments, an attention scheme is used to extract useful information from a sentence to be written into memory. Given a sentence $w = \{w_1, w_2, \ldots, w_n\}$ and the corresponding word embedding vectors $\{w_1, w_2, \ldots, w_n\}$, a summary of the sentence is firstly generated using a bidirectional RNN, yielding the states for the forward pass $\{\overrightarrow{w_1}, \overrightarrow{w_2}, \ldots, \overrightarrow{w_n}\}$ and for the backward pass $\{\overleftarrow{w_1}, \overleftarrow{w_2}, \ldots, \overleftarrow{w_n}\}$. The summary vector may be the concatenation of the last state of forward pass and the first state of the backward pass:

$$s = \text{concat}(\overrightarrow{w_n}, \overleftarrow{w_1}) \qquad (16)$$

In one or more embodiments, the context vector is the concatenation of the word embedding vector and the state vectors of both forward and backward passes:

$$\overline{w_i} = \text{concat}(w_i, \overrightarrow{w_i}, \overleftarrow{w_i}) \qquad (17)$$

The word level attention $\gamma = [\gamma_1, \gamma_2, \ldots, \gamma_n]$ may be computed as the cosine similarity between transformed sentence summary vector s and each context vector $\overline{w_i}$:

$$\gamma_i = \cos(f_{MLP}^{\theta_1}(s), f_{MLP}^{\theta_2}(\overline{w_i})) \qquad (18)$$

In one or more embodiments, both MLPs contain two FC layers with output dimensions of 1024 and a linear and a Tanh activation for each layer respectively. The content $c_s$ to be written into the memory may be computed as:

$$c_s = W\gamma = \{w_1, w_2, \ldots, w_n\}\gamma \qquad (18)$$

2. Importance Gate

In embodiments, the content importance gate is computed as $g_{mem} = \sigma(f_{MLP}(S))$, meaning that the importance of the content to be written into the memory depends on the sentence from the teacher. The MLP may contain two FC layers with ReLU activation and output dimensions of 50 and 30 respectively. Another FC layer with a linear activation, and an output dimension of 20 may be used. In embodiments, the output layer is an FC layer with an output dimension of 1 and a sigmoid activation σ.

I. Embodiments of Training Details

In embodiments, the network is trained with decayed Adagrad. A batch size of 16, a learning rate of $1 \times 10^{-5}$ and a weight decay rate of $1.6 \times 10^{-3}$ was used. Experience replay is also exploited. The reward discount factor γ was 0.99, the word embedding dimension d was 1024 and the dictionary size k was 80. The visual image size was 32×32, the maximum length of generated sentence was 6 and the memory size was 10. For the proposed embodiment approach, a sampling operation was used for sentence generation during training for exploration while a max operation was used during testing. The max operation is used in both training and testing for all baseline approaches. Word embedding vectors were initialized as random vectors and remained fixed during training.

J. Example Dialogues on Novel Data

In embodiments, models were trained on the Animal dataset, and the evaluation was performed on the Fruit dataset. Example dialogues of different approaches are shown in FIGS. 13A-13D. It is observed that Reinforce arrives at a policy that the learner keeps silent. Both Imitation and Imitation+Gaussian-RL can generate sensible sentences, but cannot speak adaptively according to context. Proposed can speak according to context adaptively, asking information about novel classes, and answering questions after being taught only once by the teacher.

K. Some Conclusions

In this patent document, embodiments for grounded language acquisition with one-shot visual concept learning were presented. This result was achieved by purely interacting with a teacher and learning from feedback arising naturally during interaction through joint imitation and reinforcement learning, with a memory augmented network. Experimental results show that the model embodiments are effective for language acquisition with one-shot learning across several different settings. The proposed embodiment may be further applied to more realistic environments and a persistent memory across sessions may be used in a life-long learning setting.

L. System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 14:
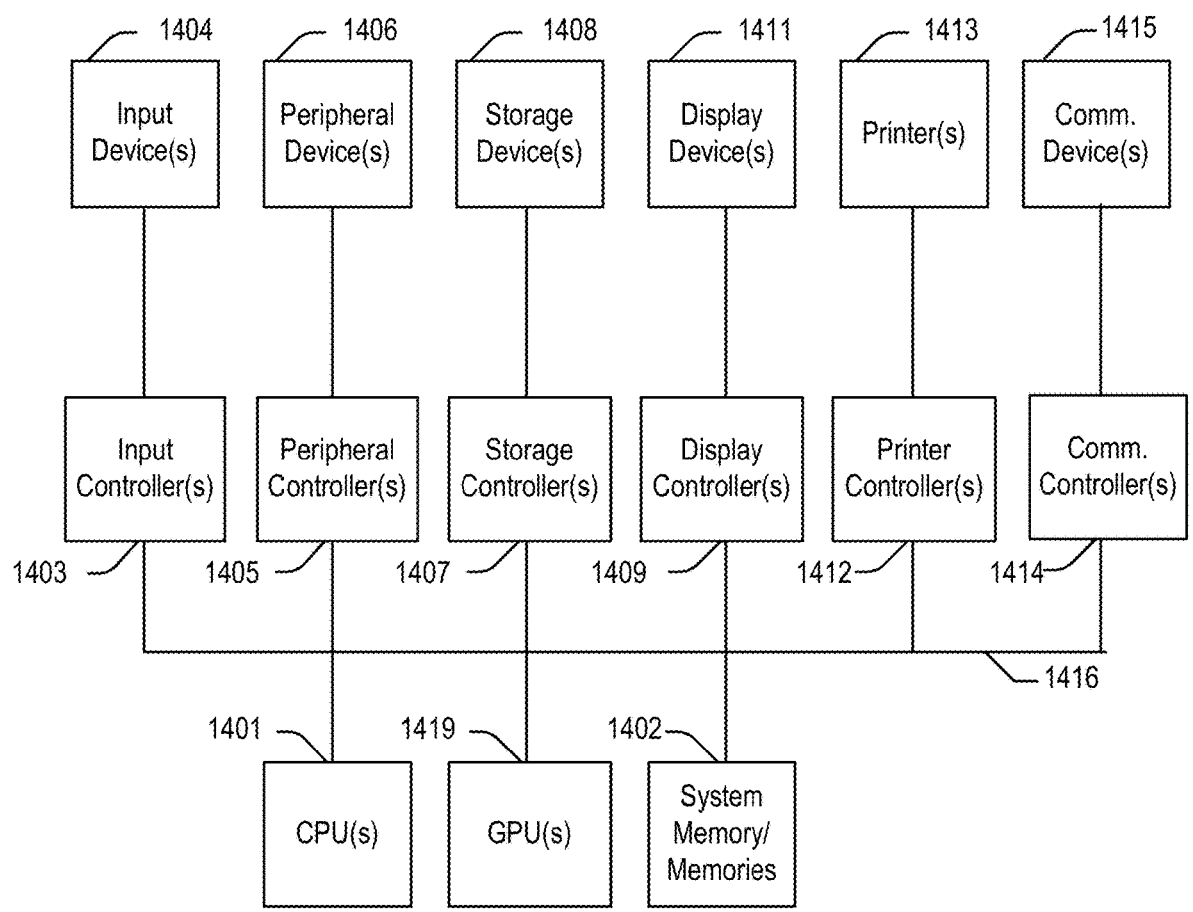
FIG. 14 depicts a simplified block diagram of a computing device/information handling system, in accordance with embodiments of the present document.

FIG. 14 depicts a simplified block diagram of a computing device/information handling system (or computing system) according to embodiments of the present disclosure. It will be understood that the functionalities shown for system 1400 may operate to support various embodiments of a computing system—although it shall be understood that a computing system may be differently configured and include different components, including having fewer or more components as depicted in FIG. 14.

As illustrated in FIG. 14, the computing system 1400 includes one or more central processing units (CPU) 1401 that provides computing resources and controls the computer. CPU 1401 may be implemented with a microprocessor or the like, and may also include one or more graphics processing units (GPU) 1419 and/or a floating-point coprocessor for mathematical computations. System 1400 may also include a system memory 1402, which may be in the form of random-access memory (RAM), read-only memory (ROM), or both.

A number of controllers and peripheral devices may also be provided, as shown in FIG. 14. An input controller 1403 represents an interface to various input device(s) 1404, such as a keyboard, mouse, touchscreen, and/or stylus. The computing system 1400 may also include a storage controller 1407 for interfacing with one or more storage devices 1408 each of which includes a storage medium such as magnetic tape or disk, or an optical medium that might be used to record programs of instructions for operating systems, utilities, and applications, which may include embodiments of programs that implement various aspects of the present invention. Storage device(s) 1408 may also be used to store processed data or data to be processed in accordance with the invention. The system 1400 may also include a display controller 1409 for providing an interface to a display device 1411, which may be a cathode ray tube (CRT), a thin film transistor (TFT) display, organic light-emitting diode, electroluminescent panel, plasma panel, or other type of display. The computing system 1400 may also include one or more peripheral controllers or interfaces 1405 for one or more peripherals 1406. Examples of peripherals may include one or more printers, scanners, input devices, output devices, sensors, and the like. A communications controller 1414 may interface with one or more communication devices 1415, which enables the system 1400 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1416, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for interaction-based language learning in a session comprising a plurality of time steps, the method comprising:
receiving, at a time step, an input comprising a visual image and a natural language input comprising zero or more words related to the visual image;
using a visual encoder to encode the visual image into a visual feature representation;
using an attention mechanism to encode the natural language input into a natural language input representation;
generating at a first neural network a state vector based on at least the natural language input representation and a prior state vector;
storing, via the first neural network, into a memory the visual feature representation and the natural language input representation as a visual modality and sentence modality pair;
passing the state vector through a residue-structured network to produce a control vector as a state input to modulate behavior of a second neural network; and
using at least the control vector to adaptively select, using learned attention and content importance, between a proposed response portion indicated by the second neural network and a proposed response portion indicated using at least a portion of a natural language input representation retrieved from the memory using the visual feature representation as a visual key to retrieve the natural language input representation to form a response corresponding to the input.

2. The computer-implemented method of claim 1 further comprising:
using a final state of the second neural network at the time step as an input to the first neural network at a next time step.

3. The computer-implemented method of claim 1 wherein the session ends if the response is a correct response or when a maximum number of interaction steps is reached.

4. The computer-implemented method of claim 1 wherein the residue-structured network is an identity mapping augmented network with a learnable controller.

5. The computer-implemented method of claim 4 wherein the learnable controller receives the state vector and generates an output, the control vector is obtained by combining the learnable controller's output with the state vector.

6. The computer-implemented method of claim 1 further comprising:
generating feedback and reward, by a teacher, according to the natural language input, the visual image and the response.

7. The computer-implemented method of claim 6 wherein the reward is a scalar-valued feedback with positive value as encouragement and negative value as discouragement according to correctness of the response.

8. The computer-implemented method of claim 6 wherein the reward is leveraged to adjust an action policy in generating a response, by maximizing expected future reward as represented by a reinforce cost function.

9. The computer-implemented method of claim 8 wherein the action policy is simultaneously optimized by minimizing the error in predicting the natural language input by an imitation cost function at the first neural network and sharing parameters between the first and second neural networks.

10. The computer-implemented method of claim 1 wherein in a memory write operation, a content importance gate is computed as a function of the natural language input to adaptively control whether to write a content of the natural language input into the memory.

11. A computer-implemented method for a trained agent to use acquired language ability and developed one-shot learning ability, the method comprising:
receiving an input comprising a visual image and a natural language input comprising zero or more words related to the visual image;
encoding, using a visual encoder, the visual image into a visual key;
using an attention mechanism to encode the natural language input into a natural language input representation;
generating at a first neural network a state vector based on at least the natural language input representation and a prior state vector;
producing a control vector based on the state vector to modulate behavior of a second neural network; and
using a fusion gate that is at least partially controlled by the control vector to adaptively select between a proposed response portion indicated by the second neural network and a proposed response portion indicated using at least a portion of a natural language input representation retrieved from a memory using the visual key to retrieve the natural language input representation to form a response corresponding to the input, the memory stores at least one visual modality and sentence modality pair, each pair comprising a stored visual feature representation and a stored natural language input representation.

12. The computer-implemented method of claim 11 wherein the at least one visual modality and sentence modality pair is stored, via the first neural network, using historic natural language inputs and associated visual inputs based on learned content importance.

13. The computer-implemented method of claim 12 wherein the stored natural language input representation is obtained based on a matrix with columns being embedding vectors of all words from a related historic natural language input and a normalized attention vector representing the relative importance of each word in the related historic natural language input.

14. The computer-implemented method of claim 11 wherein the proposed response portion indicated by the second neural network is extracted from the natural language input via word-level attention and content importance jointly.

15. The computer-implemented method of claim 11 wherein the natural language input representation is retrieved from the memory by cross modality retrieval, which is implemented by using the visual key to obtain a soft reading weight.

16. The computer-implemented method of claim 15 wherein the soft reading weight is obtained by calculating a cosine similarity between the visual key and the stored visual feature representation, the at least a portion of the natural language input representation is retrieved as an embedding vector corresponding to a label word associated with the visual image by implementing a product between the obtained soft reading weight and the stored natural language input representation.

17. A system for interactive language acquisition with one-shot visual concept learning, the system comprising:
   a visual encoder to encode a visual image into a visual feature representation;
   a first neural network to generate a state vector based on at least a natural language input comprising zero or more words related to the visual image and a prior state vector using historical information;
   a memory storing at least one visual modality and sentence modality pair, each visual modality and sentence modality pair comprising a visual feature representation and a natural language input representation;
   a residue-structured network receiving the state vector to produce a control vector; and
   a second neural network receiving the control vector for behavior modulation, the second neural network adaptively selects between a proposed response portion indicated by the second neural network and a proposed response portion indicated using at least a portion of a natural language input representation retrieved from the memory using the visual feature representation as a visual key to retrieve the natural language input representation to form a response corresponding to the input.

18. The system of claim 17 wherein the first neural network and the second neural network are both recurrent neural networks (RNNs) and share parameters.

19. The system of claim 17 wherein the residue-structured network comprises a learnable controller to receive the state vector and generate an output, the control vector is obtained by combining the controller's output to the state vector.

20. The system of claim 17 wherein the second neural network comprises one or more fusion gates to adaptively switch between the proposed response portion indicated by the second neural network and the proposed response portion retrieved from the memory based, at least in part, upon learned attention and content importance.

* * * * *